Patented July 17, 1923.

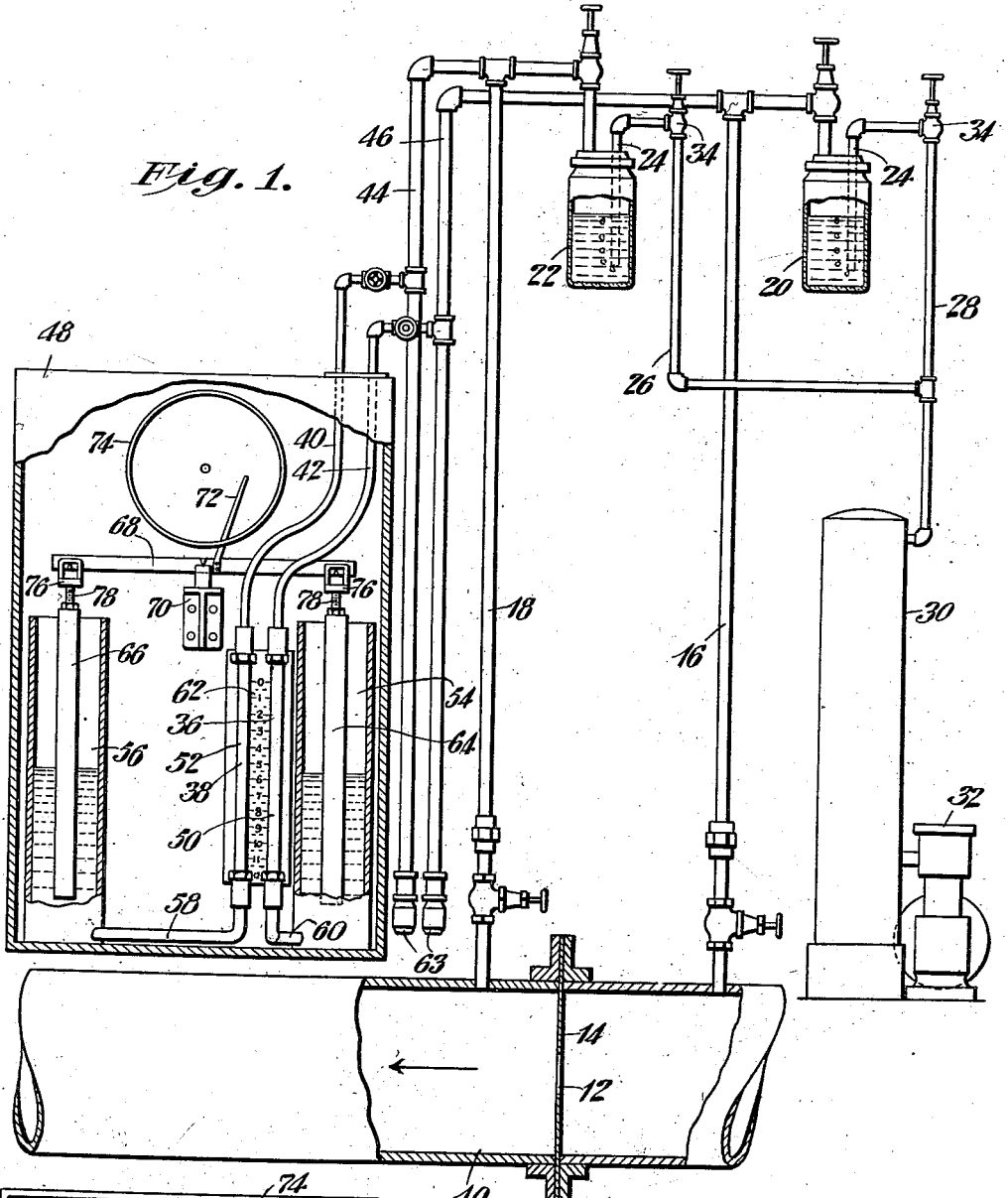

1,462,170

UNITED STATES PATENT OFFICE.

BENJAMIN GREENFIELD, OF BARTLESVILLE, OHIO, ASSIGNOR, BY MESNE ASSIGNMENTS, TO DOHERTY RESEARCH COMPANY, OF NEW YORK, N. Y., A CORPORATION OF DELAWARE.

FLUID METER.

Application filed March 27, 1919. Serial No. 285,597.

*To all whom it may concern:*

Be it known that I, BENJAMIN GREENFIELD, a citizen of the United States, residing at Bartlesville, 416 Choctaw Ave., in the county of Washington, State of Ohio, have invented certain new and useful Improvements in Fluid Meters (Case B); and I do hereby declare the following to be a full, clear, and exact description of the invention, such as will enable others skilled in the art to which it appertains to make and use the same.

This invention relates to fluid meters and more particularly to meters for measuring the volume and rate of flow of liquid flowing through a conduit.

The usual liquid meter such as the orifice meter and the Venturi meter have not been successfully used for measuring the volume of flow of heavy viscous liquids such as crude petroleum and other heavy mineral and vegetable oils because these viscous liquids are not adapted to flow in the small pressure tubes, used in such meters, to make accurate measurements of the variations of pressure of the liquid. Further, the physical properties of such heavy liquids vary widely in changes in temperature so that the meter must be close to the fluid conduit and substantially uniform temperature conditions must be maintained.

The primary object of the present invention is to provide a fluid meter which is adapted to make accurate measurements of the volume and rate of flow of any type of liquid flowing through a conduit.

Another object of the invention is to provide a meter which will give a continuous record of the volume and rate of flow of any kind of liquid flowing through a conduit.

With these and other objects in view, the invention consists in the improved fluid meter hereinafter described and particularly defined in the claims.

The various features of the invention are illustrated in the accompanying drawing, in which, Figure 1 is a view in front elevation, partly in section, illustrating an orifice meter embodying the preferred form of the invention; and Fig. 2 is a top plan view of the meter recording mechanism with the cover of the recorder casing removed.

The meter illustrated in the drawings embodies the principle of the well known orifice meter and the measurements made by the meter depend upon the fluid pressure differential in the measuring conduit at opposite sides of a standard orifice plate. The fluid to be measured flows through a conduit 10 and passes through an orifice 12 formed in an orifice plate 14 mounted transversely of the conduit. The orifice 12 has a predetermined size which will cause the liquid flowing through the orifice to have a definite drop in pressure, and the difference in pressure between the liquid at the opposite sides of the plate gives the basis of measurement of the volume and rate of flow of liquid flowing through the conduit.

The liquid pressure at opposite sides of the orifice plate 14 is measured by building up a differential gas pressure in the conduit at opposite sides of the plate which is proportional to the liquid pressure in the conduit, and using the gas pressures developed to give a continuous record of the volume of flow of liquid passing through the conduit. To this end, tubes 16 and 18 are connected to the conduit at opposite sides of the orifice plate 14, the tube 16 being positioned a distance approximately equal to the diameter of the conduit from the up stream or high pressure side of the orifice plate and the tube 18 being positioned a distance approximately equal to one-half the diameter of the conduit from the down stream or low pressure side of the orifice plate. The tubes 16 and 18 are connected respectively with sight-feeding cups 20 and 22 which are transparent and partly filled with an indicating liquid. Gas inlet pipes 24 are positioned in the cups 20 and 22 and extend nearly to the bottoms of the cups so that gas emerging from the lower ends of the pipes will bubble through the indicating liquid. When the meter is in operation and gas under pressure is being forced through the pipes 24, gas will be forced through the tubes 16 and 18 into the conduit 10 at the same rate as the gas bubbles from the lower end of the pipes 24. The pipes 24 are connected by means of pipes 26 and 28 with a pressure gas holder 30. The gas used in making the measurement may be any gas which is not soluble in the liquid being measured and when the meter is used in the oil well fields, natural gas is often available for this purpose. As illustrated in the drawings, the gas may be air which is pumped into the receiver 30 by means of a compressor 32.

When the meter is in operation, the gas used for making the measurement will be controlled by means of valves 34 to cause the gas to very slowly bubble from the lower ends of the measuring tubes 16 and 18. The pressures developed in the tubes 16 and 18 are measured respectively by means of manometers 36 and 38 which are connected with the tubes by means of pipes 40, 42, 44 and 46. The manometers 36 and 38 are positioned in a recorder casing 48 and consist of transparent indicating legs 50 and 52 which are connected to the pipes 40 and 42, and enlarged displacement legs 54 and 56 which are connected respectively with the indicating legs by tubes 58 and 60. Behind the indicating legs 50 and 52 is placed an indicating scale 62 which is provided with graduations of suitable units to read directly the pressures developed in the tubes 16 and 18. The displacement legs 54 and 56 are open to atmosphere and the measurements on the indicating scale 62 are made by comparison of the pressures developed in the legs 52 and 50 and atmospheric pressure. The pipes 44 and 46 are extended downwardly below the connections therewith of the pipes 40 and 42 to permit any liquid which might be condensed in the pipes to be removed through traps 63.

To make a continuous record of the volume of liquid flowing through the conduit 10, displacement members 64 and 66 are suspended in the manometer liquid of the displacement legs 54 and 56 and are pivotally connected to the opposite ends of a beam 68 centrally pivoted on a bracket 70. A recording pen 72 is attached to the beam 68 and arranged to move over a chart which may be rotated by clockworks mounted in a casing 74. The movement of the liquid in the manometer legs 54 and 56 due to variations in pressure of the gas in the measuring tubes 16 and 18 will impart a movement to the recording pen 72 which may be converted to read directly in terms of volume of flow of liquid passing through the conduit in a unit of time, or the rate of flow of the liquid.

To place the recording mechanism in adjustment for making accurate readings, the sight-feeding cups 20 and 22 are disconnected from the tubes 16 and 18 to permit the indicating legs 50 and 52 of the manometers 36 and 38 to be open to atmosphere. The manometer liquid, which preferably consists of a mineral seal oil, is placed in the displacement legs 54 and 56 until the liquid in the indicating legs 50 and 52 reads at zero. Simultaneously with the adjustment of the liquid in the manometer legs 50 and 52 to zero and while the manometers are open to atmosphere, the beam 68 should be adjusted to bring the recording pen to zero on the chart. To permit the pen 72 to be brought to zero on the chart, the displacement rods 64 and 66 are arranged to be adjusted longitudinally of the manometer legs 54 and 56. To accomplish this, the pivots 76, by which the displacement rods are connected to the beam 68, are provided with threaded shanks 78 which are screwed into the upper ends of the displacement rods 64 and 66. When the pen 72 has been brought to zero on the chart and the manometer liquid brought to zero on the indicating legs 50 and 52, the recording mechanism is then in proper adjustment for making readings and the sight-feeding cups 20 and 22 are connected to place the measuring tubes 16 and 18 under pressure. The meter once properly adjusted is standard for all capacities and may be adapted for different rates of flow by substituting different orifice plates 14 which have different sizes of orifices 12. The size of the orifice 12 which preferably should be used for the desired maximum rate of flow should produce predetermined differences in static pressure in the tubes 16 and 18 that will cause the manometer liquid to travel the full standard differential deflection on the scale 62 and allow the recording pen to move through the full radius of the chart. It will be noted that the difference between the manometer readings on the scale 62 gives a direct indication of the pressure differential of the liquid flowing in the conduit 10 and this indication serves as an accurate means for checking the record being made by the pen 72.

With a meter construction such as outlined above, it will be seen that accurate measurement of the volume of flow as well as instantaneous rate of flow may be made of any liquid which will flow through a conduit and pass through an orifice. The liquid being measured does not come into contact with the recording mechanism or leave the measuring conduit, but all measurements are made by means of a gas which comes directly in contact with the liquid being measured. Further, the measurements are made by a gas which is not affected by atmospheric conditions, and the recording mechanism may be located at any desired distance from the liquid conduit without affecting the accuracy of the measurements.

The mechanism for measuring, indicating and recording the volume or rate of flow of liquid flowing through a conduit has been illustrated and described as being used to measure the pressure differential at opposite sides of an orifice plate. The mechanism, however, is not limited to such use but may be used in connection with any of the devices for measuring the flow of liquid in a conduit by producing an obstruction to the flow of the liquid to develop a plurality of different pressures having a definite relation to one another.

Although manometers have been shown and described as being used for indicating and recording the pressure differential, it is obvious that many other forms of pressure differential recording and indicating devices might be used such as those used on the many types of orifice and Venturi meters.

In the specification and claims, the word "fluid" is used in its broadest sense, and is intended to cover either a gas or a liquid.

The preferred form of the invention having been thus described, what is claimed as new is:

1. A fluid meter comprising in combination a conduit for fluid, means in said conduit for developing a difference in pressure in said fluid having a definite relation to the rate of flow of the fluid, means for forcing separate streams of fluid at a regulated rate into said conduit at pressures substantially equal to those on opposite sides of said differential pressure development means, and means for measuring the difference in pressures of said separate streams of fluid.

2. A fluid meter having, in combination, a conduit for carrying the fluid to be measured, a device positioned within said conduit having means arranged to develop in said fluid different pressures of a definite relation to one another, a device connected with said conduit at the points where different pressures are developed in said conduit by said device, a source of gas under pressure connected with said tubes, means to regulate the flow of gas into said tubes to produce a pressure therein independently of the fluid pressure in the conduit proportional to the different pressures developed in said conduit by said device, and means connected with said tubes for indicating the pressures developed therein.

3. A fluid meter having, in combination, a conduit for carrying the fluid to be measured, a device positioned within said conduit having means arranged to develop in said fluid different pressures of a definite relation to one another, tubes connected with said conduit at points where different pressures are developed in said conduit by said device, a source of gas under pressure connected with said tubes, means to regulate the flow of gas into said tubes to produce a pressure therein independently of the fluid pressure in the conduit and proportional to the different pressures developed in said conduit by said device, and means connected with said tubes for recording the rate of flow of fluid through said conduit.

4. A fluid meter having, in combination, a conduit for carrying the fluid to be measured, a device positioned within said conduit having means arranged to develop in said fluid different pressures of a definite relation to one another, tubes connected with said conduit at points where different pressures are developed in said conduit by said device, a source of gas under pressure connected with said tubes, means to regulate the flow of gas into said tubes to produce pressures therein independently of the fluid pressure in the conduit and proportional to the different pressures developed in said conduit by said device, means connected with said tubes for indicating the pressure developed therein, and means controlled by said indicating means for recording the rate of flow of fluid through said conduit.

5. A fluid meter having, in combination, a conduit for carrying the liquid to be measured, an orifice plate positioned in said conduit, pressure tubes connected with said conduit at opposite sides of said plate, a source of gas under pressure connected with said tubes, means to regulate the flow of gas through said tubes to cause gas to slowly bubble into said conduit, and means for measuring the pressure differential in said tubes.

6. A fluid meter having, in combination, a conduit for carrying the liquid to be measured, an orifice plate positioned in said conduit, pressure tubes connected with said conduit at opposite sides of said plate, a source of gas under pressure connected with said tubes, means to regulate the flow of gas through said tubes to cause gas to slowly bubble into said conduit, and manometers connected with said tubes arranged to indicate the pressure differential in said tubes.

7. A fluid meter having, in combination, a conduit for carrying the liquid to be measured, an orifice plate positioned in said conduit, pressure tubes connected with said conduit at opposite sides of said plate, a source of gas under pressure connected with said tubes, means to regulate the flow of gas through said tubes to cause gas to slowly bubble into said conduit, manometers connected with said tubes, displacement rods suspended in one leg of each of said manometers, a pivoted beam connecting said rods, and a recording device mounted on said beam.

8. A fluid meter having, in combination, a conduit for carrying the liquid to be measured, an orifice plate positioned in said conduit, pressure tubes connected with said conduit at opposite sides of said plate, a source of gas under pressure connected with said tubes, means to regulate the flow of gas through said tubes to cause gas to slowly bubble into said conduit, manometers connected with said tubes, displacement rods suspended in one leg of each of said manometers, the other leg of each of said manometers being transparent to show the manometer liquid, an indicating scale mounted adjacent said transparent manometer legs, a pivoted beam connecting said rods, and a recording device mounted on said beam.

9. A fluid meter having, in combination, a conduit for carrying the liquid to be measured, an orifice plate positioned in said conduit, pressure tubes connected with said conduit at opposite sides of said plate, a source of gas under pressure connected with said tubes, means to regulate the flow of gas through said tubes, a sight-feeding device for indicating the velocity of flow of said gas, and means for indicating the pressure differential in said tubes.

10. A fluid meter having, in combination, a conduit for carrying the liquid to be measured, an orifice plate positioned transversely of said conduit, pressure tubes connected with said conduit at opposite sides of said plate, the tube on the up stream or high pressure side of the orifice plate being connected with the conduit at a point spaced from the plate approximately equal to the diameter of the conduit, and the tube on the down stream or low pressure side of the orifice plate being connected with the conduit at a point spaced from the plate approximately equal to one half of the diameter of the conduit, sight-feeding devices connected with said tubes, a source of gas under pressure connected with said devices, and mechanism connected with said tubes for measuring the pressure therein.

11. A fluid meter which comprises a conduit for fluid, an orifice plate in said conduit, means for forcing fluid into said conduit at opposite sides of said orifice, and means for measuring the difference in pressures under which the fluid is forced into said conduit at opposite sides of said orifice plate.

12. A method of measuring the flow of fluids which comprises developing in said fluid different pressures which have a definite relation to the flow of the fluid being measured, passing separate streams of fluid into said fluid being measure at the points where the different pressures are developed and under pressures substantially equal to the developed pressures, and measuring the difference in pressures of said fluid streams.

13. A method of measuring the flow of fluids which comprises passing said fluid through an orifice plate, passing a slow, regulated stream of gas into said fluid before it passes said plate, passing a second slow, regulated stream of gas into said fluid after it passes said orifice and measuring the difference in pressures in said streams of gas.

In testimony whereof I affix my signature.

BENJAMIN GREENFIELD.